United States Patent [19]
Boucot et al.

[11] Patent Number: 6,063,357
[45] Date of Patent: *May 16, 2000

[54] PROCESS FOR PURIFYING A GAS CONTAINING HYDROGEN SULPHIDE AND SULPHUR DIOXIDE

[75] Inventors: Pierre Boucot, Ternay; Jean-Charles Viltard, Valence, both of France

[73] Assignee: Institut Francais du Petrole, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/988,980

[22] Filed: Dec. 11, 1997

[30] Foreign Application Priority Data

Dec. 12, 1996 [FR] France ................................ 96 15474

[51] Int. Cl.⁷ ............................ B01D 53/48; C01B 17/04
[52] U.S. Cl. ...................................... 423/575; 423/576.7
[58] Field of Search ................................ 423/575, 576.7

[56] References Cited

U.S. PATENT DOCUMENTS

| | | | |
|---|---|---|---|
| 2,998,304 | 8/1961 | Urban et al. | 23/225 |
| 3,598,529 | 8/1971 | Deschamps et al. | 23/225 R |
| 3,676,356 | 7/1972 | Roberts et al. | 252/192 |
| 3,928,548 | 12/1975 | Deschamps et al. | 423/575 |
| 4,056,606 | 11/1977 | Germerdonk et al. | 423/575 |
| 4,069,302 | 1/1978 | Meadow | 423/575 |
| 4,508,692 | 4/1985 | Savage et al. | 423/228 |
| 4,678,648 | 7/1987 | Wynn | 423/228 |
| 5,935,547 | 8/1999 | LeComte et al. | 423/575 |
| 5,951,961 | 9/1999 | Viltard et al. | 423/575 |

FOREIGN PATENT DOCUMENTS

| | | |
|---|---|---|
| 2115721 | 7/1972 | France . |
| 2 216 223 | 8/1974 | France . |
| 2 338 738 | 8/1977 | France . |
| 2 532 190 | 3/1984 | France . |
| 19 10 127 | 9/1969 | Germany . |
| 7-299320 | 11/1995 | Japan . |
| 1 223 732 | 3/1971 | United Kingdom . |
| WO 93/01125 | 1/1995 | WIPO . |

OTHER PUBLICATIONS

Database WPI, Section Ch, Week 7929, AN 79–53653B, Derwent Publications Ltd., London, GB, Jun. 11, 1979 for Japan Patent Document No. 7701398 (Nov. 1977).
Barthel et al. "de Sulfuration des Fumées..." *Informations Chimie* No. 136 pp. 235–238, 1985
Barthel et al. "Bilan des Émissions Soufrées..." *Pétrole et Techniques* No. 392 pp. 40–48, Sep. 1993.

*Primary Examiner*—Steven P. Griffin
*Assistant Examiner*—Timothy C Vanoy
*Attorney, Agent, or Firm*—Millen, White, Zelano, & Branigan, P.C.

[57] ABSTRACT

A process for the production of elemental sulphur by reacting hydrogen sulphide with sulphur dioxide in a liquid reaction medium comprising an organic solvent for the two compounds, e.g., ethylene glycol, and containing at least one soluble catalytic basic compound, e.g., sodium salicylate, comprises bringing a gas mixture containing sulphur dioxide and hydrogen sulphide into contact with a co-current of the solvent containing the catalytic basic compound.

14 Claims, 1 Drawing Sheet

PROCESS FOR PURIFYING A GAS CONTAINING HYDROGEN SULPHIDE AND SULPHUR DIOXIDE

FIELD OF THE INVENTION

The present invention concerns a process and apparatus for purifying a gas containing hydrogen sulphide and sulphur dioxide.

BACKGROUND OF THE INVENTION

A variety of gas mixtures originating from refineries and natural gas contain hydrogen sulphide ($H_2S$) which must be eliminated as completely as possible by recovering sulphur so as to be able to discharge into the atmosphere a gas which satisfies regulations fixed by various industrialised countries. While these regulations were relatively easy to satisfy in the very recent past since they were relatively lenient, this is not the current case particularly in countries such as the United States of America or some states in that country and a gas mixture containing more than 500 parts per million (ppm) of sulphur dioxide and hydrogen sulphide can no longer be discharged into the atmosphere.

As long ago as 1970, the Institut Francais du Petrole developed a process for eliminating hydrogen sulphide as elemental sulphur using the Claus reaction under conditions which were particularly favourable as regards ease of operation and the relatively low cost of the process. The process, which is known under the trade name Claupol 500, employs a homogeneous catalyst in a solvent to transform hydrogen sulphide to elemental sulphur at a temperature of less than 160° C. by reaction with sulphur dioxide ($SO_2$). After treating the acidic gas containing hydrogen sulphide in a conventional Claus unit, it produces an overall sulphur yield of more than 98%. This process is used industrially in more than 30 plants in various countries of the world, among them the United States.

The initial process developed in the 70s has recently been improved, at the beginning of the 90s, and can now produce a sulphur yield which is of the order of 99.5%. The initial process is described, for example, in the article by Y. Barthel et al., published in 1974 in n°136 of the review "Informations Chimie", pages 235 to 238, and in "Pétrole et Technique", n°136, October 1993, pages 24 to 39. The improved process normally known as the CLAUSPOL 300 process has been described in the "Revue de l'Institut Francais du Petrole", vol. 49, n°5, September–October 1994, pages 491–493.

Those two processes use a liquid phase essentially constituted by glycol which is circulated as a counter-current to the gas mixture to be purified containing hydrogen sulphide and sulphur dioxide in a ratio of close to 2. Such processes use a catalyst dissolved in glycol, which is selected from alkali or alkaline-earth metal carboxylates.

The prior art is also illustrated in the following patents: French patents FR-A-2 216 223, FR-A-2 532 190, FR-A-2 338 738 and Japanese patent JP-A-54 072 762 (WPI Database, Section Ch, Week 7929, Derwent Publications Ltd., London, GB; AN 79-53653 B).

SUMMARY OF THE INVENTION

The present invention concerns the treatment of a gas mixture comprising sulphur dioxide and hydrogen sulphide. Mixtures which can be treated using the process of the present invention may be the gases discharged by sulphuric acid production factories, by combustion plants using fuels containing sulphur, and those originating from the transformation of hydrogen sulphide to elemental sulphur by the Claus process. In all of these cases, in addition to sulphur dioxide, the gas mixture which can be treated using the process of the present invention will also contain hydrogen sulphide, preferably in a quantity which is close to the stoichiometric quantity for the Claus reaction, namely two moles of hydrogen sulphide per mole of sulphur dioxide. If the mixture to be treated does not contain hydrogen sulphide or contains only a little, it will be necessary to add it before introduction into the reactor in which the process of the present invention is carried out. If the mixture to be treated contains too much hydrogen sulphide, a portion of it can, for example, be transformed into sulphur dioxide by oxidation so as to obtain a suitable ratio of the two compounds.

We have, surprisingly, discovered that the process for recovering sulphur from a gas mixture containing hydrogen sulphide and sulphur dioxide can be further improved by reacting these two compounds with each other in a liquid reaction medium comprising a solvent for these two compounds, preferably a glycol type solvent, by bringing the gas mixture containing sulphur dioxide and hydrogen sulphide into co-current contact in the presence of at least one basic compound which is soluble in the solvent used.

In a preferred implementation, the liquid reaction medium will contain at least one alkali metal or alkaline-earth metal carboxylate in the dissolved state but it is also possible to use other basic compounds such as ammonia.

Preferably, the quantity of hydrogen sulphide contained in the liquid medium in which elemental sulphur is formed by reaction with sulphur dioxide is about 1.5 to about 2.5 moles and advantageously about 1.9 to about 2.1 moles of hydrogen sulphide per mole of sulphur dioxide.

The present invention is particular suitable for treating Claus plant tail gases, which still contain a small quantity of hydrogen sulphide and sulphur dioxide. In this case, a small portion of the hydrogen sulphide normally introduced into the Claus reactor inlet is usually extracted without modifying the quantity of air injected. In this way, the gases discharged by the Claus plant comprise $H_2S$ and $SO_2$, in an $H_2S/SO_2$ molar ratio of a little less than 2. This ratio is then adjusted to obtain a ratio of close to 2 in the solvent by adding a suitable quantity of hydrogen sulphide to the gas mixture which has been removed from the Claus plant inlet.

In a further implementation, a ratio of air/$H_2S$ introduced into the Claus plant is selected so as to produce a tail gas containing a proportion of hydrogen sulphide and sulphur dioxide such that the $H_2S/SO_2$ ratio is close to 2.

In the process of the present invention, the solvents which can be used are those which can dissolve $H_2S$ and $SO_2$ and which are stable at the temperature selected for the elemental sulphur formation reaction. These solvents are, for example, those mentioned in our French patents FR-A-2 123 778 and FR-B-1 601 098. A glycol is preferably used, such as ethylene glycol, propylene glycol, a liquid polyethylene glycol and a liquid polypropylene glycol. Advantageously, a polyethylene glycol with a molecular weight of the order of 400 is used.

The basic compound dissolved in the solvent which is used can be one of those mentioned in the patents cited above or one of those mentioned in U.S. Pat. No. 3,598,529, which is hereby incorporated by reference. Advantageously, at least one alkali or alkaline-earth salt of a carboxylic acid is used, preferably at least one alkaline salt of a carboxylic acid containing an aromatic ring in its formula. Thus, for example, an alkaline salt of benzoic acid and/or an alkaline salt of salicylic acid can be used. A sodium salt of salicylic acid is normally used, either by introducing it into the solvent in the form of a salt, or by introducing salicylic acid and a sufficient quantity of an aqueous caustic soda solution into the solvent.

The invention also concerns an apparatus for carrying out the process. More precisely, it comprises at least one substantially vertical reactor 2 containing at least one packing 2a, the reactor comprising, proximate its upper end above the packing, at least one means 3 for introducing a gas mixture containing hydrogen sulphide and sulphur dioxide, and located below the packing, at least one means 7 for evacuating a residual gas mixture and at least one means 1 for withdrawing a liquid reaction medium, and at least one means 9, 13 for separating and recovering liquid sulphur, and at least one means 4, 14 for recycling liquid reaction medium to proximate its upper end above said packing connected to the withdrawing means 1, the apparatus further comprising at least one means 10 for indirect heat exchange connected to the means 4, 14 for recycling the liquid reaction medium.

The following examples illustrate the invention without limiting its scope.

Figure 1:
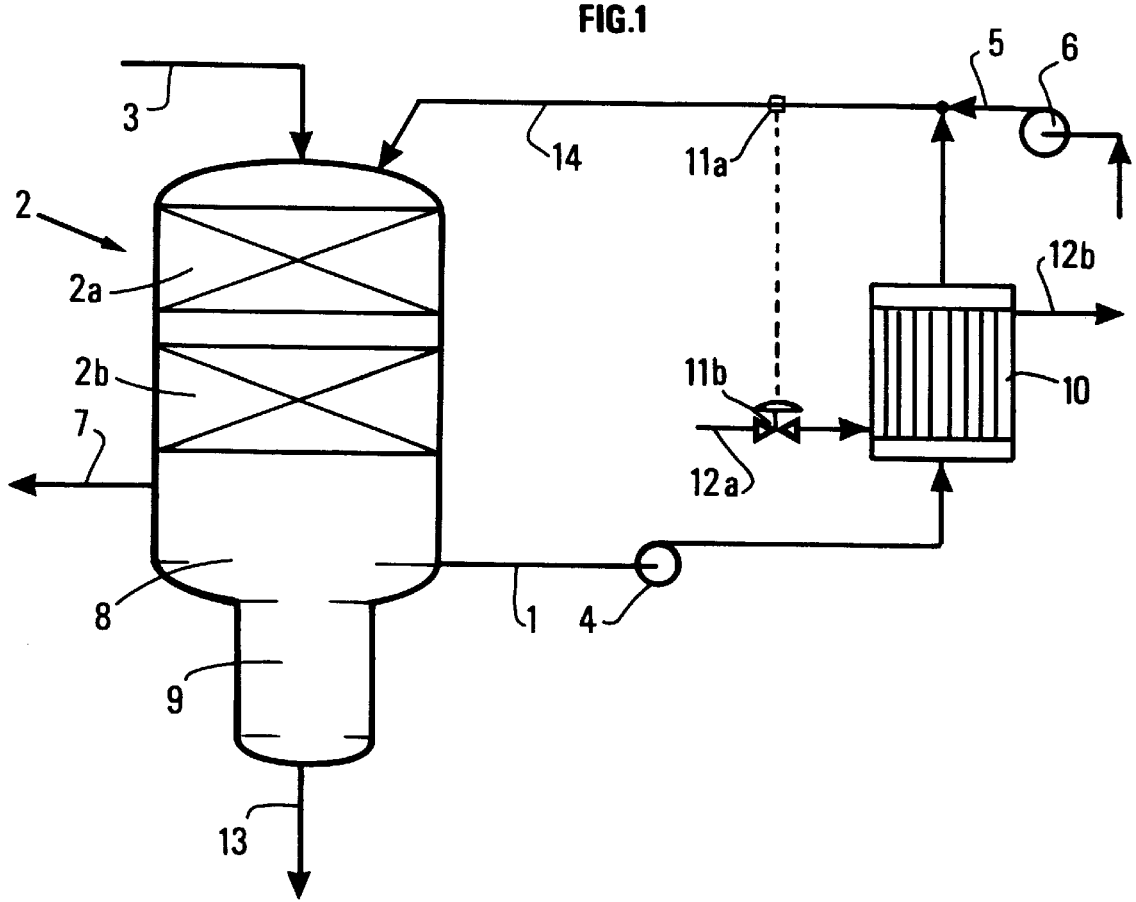
FIG. 1 schematically shows a pilot unit for forming elemental sulphur by reacting $H_2S$ and $SO_2$ when these gases are brought into contact as a co-current with the circulating catalytic solution.

EXAMPLE 1
(FIG. 1)—in Accordance with the Invention

A Claus unit gas containing, by volume, 1.375% of $H_2S$, 0.66% of $SO_2$, 35.49% of $H_2O$ and 62.51% of $N_2$ was introduced at a flow rate of 280 m³/h into a reactor-contacter constituted by a column 2 containing two beds of packing 2a and 2b. This gas was introduced to the head of the reactor via a line 3 and brought into contact, at 125° C., with a co-current of an organic solvent introduced to the head of the reactor via a line 14 and pump 4. Solvent was recycled between the bottom and top of the reactor by that line and pump at a flow rate of 20 m³/h through a heat exchanger 10 the temperature of which was controlled and regulated by a measurement/control system 11a and 11b for injecting hot water via line 12a and evacuating it via a line 12b. The temperature of the recycled solvent was 123° C.

The organic solvent used was a polyethylene glycol with a molecular mass of 400.

The soluble catalyst, continuously injected into the solvent, was constituted by an aqueous solution of sodium salicylate at a concentration of 3% by weight, caustic soda in a concentration of 6.6% by weight and water in a concentration of 90.4% by weight. It was injected into re-circulation line 1 by line 5 and pump 6. The average injection rate of catalyst and water to maintain the desired flow rate of catalyst in the solvent was 0.21 l/h.

The packing used in the example was constituted by two beds of ceramic "Intalox" saddles with a specific surface area of 250 m²/m³ which could retain small quantities of the sodium salts formed during the reaction.

The treated gas left the bottom of the reactor via a line 7 and was sent to an incinerator.

The sulphur produced in the reactor in accordance with the reaction:

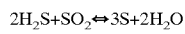

was separated in zone 9 which comprised a heating means, while the solvent which was saturated in sulphur at the reactor temperature in zone 8 was recycled by pump 4 to the head of the reactor.

The liquid sulphur formed was extracted from the bottom of the reactor via a line 13.

The quantities of $H_2S$ and $SO_2$ at the inlet line 3 and outlet line 7 of the reactor were measured to calculate the reaction yield using the following formula:

$$\frac{(\% \text{ sulphur-containing compounds at inlet} - \% \text{ sulphur-containing compounds at outlet})}{(\% \text{ sulphur-containing compounds at inlet})} \times 100$$

At the reactor inlet, the $H_2S/SO_2$ molar ratio was 2.07. The sulphur yield was 96.7%. The residual amount of $SO_2$ and $H_2S$ in the gas recovered via line 7 was 671 ppm, expressed as sulphur.

Figure 2:
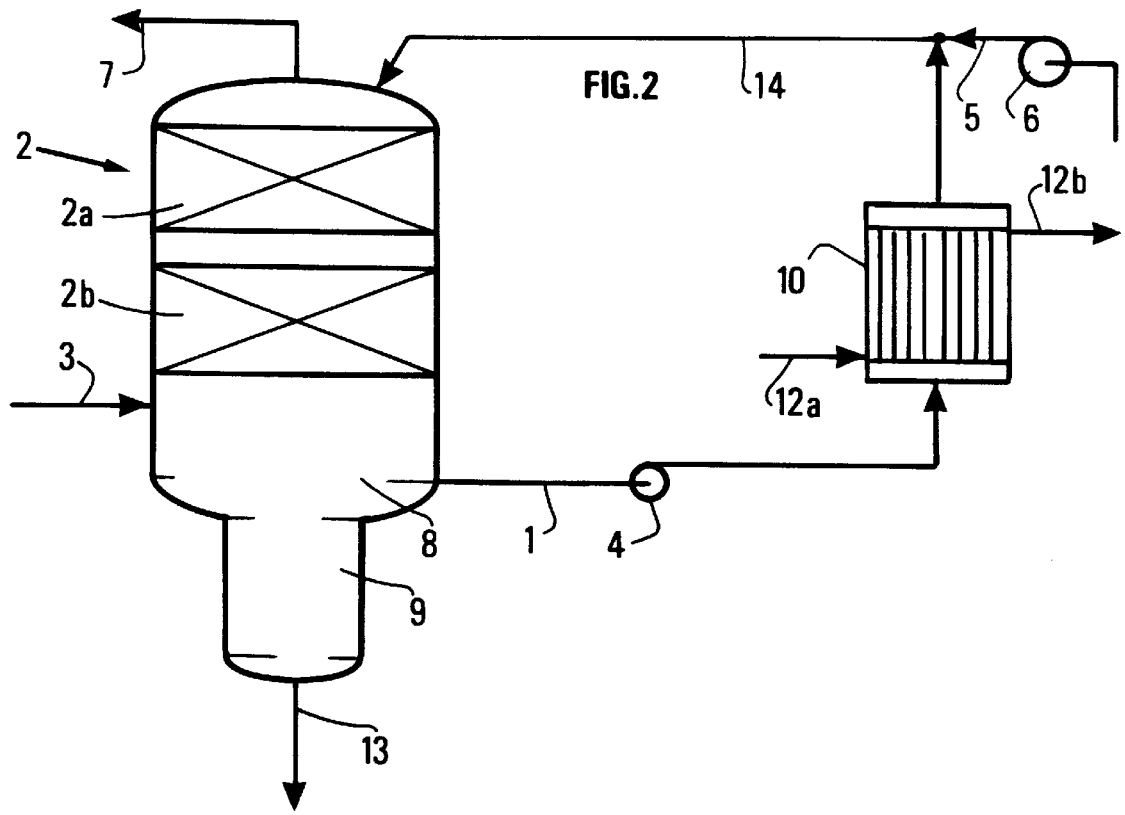
FIG. 2 schematically shows the pilot unit used to form elemental sulphur by reacting $H_2S$ with $SO_2$ when these gases are brought into contact as a counter-current with the circulating catalytic solution.

EXAMPLE 2
(FIG. 2)—comparative

Example 1 was repeated using the same operating conditions with the same reference numerals but the Claus plant gas was brought into contact with the solvent and catalyst as a counter-current. To this end, the gas was introduced at the bottom of the reactor via line 3 and purified gas was recovered at the head of the reactor. The sulphur yield was 96%. The residual $SO_2$ and $H_2S$ content in the purified gas was 810 ppm, expressed as sulphur.

What is claimed is:

1. In a process for the production of elemental sulphur by reacting hydrogen sulphide and sulphur dioxide in a liquid reaction medium comprising an organic solvent, by bringing a gas mixture containing sulphur dioxide and hydrogen sulphide into the presence of at least one catalytic basic compound which is soluble in the solvent, the improvement which comprises passing and reacting the gas mixture and liquid in a co-current mode downwardly through a vertical packed column to obtain sulfur and water.

2. A process according to claim 1, in which the gas mixture brought into contact with the solvent contains hydrogen sulphide and sulphur dioxide in a molar ratio of about 1.5 to about 2.5 moles of hydrogen sulphide per mole of sulphur dioxide.

3. A process according to claim 2, in which the solvent used is selected from the group consisting of ethylene glycol, propylene glycol, a liquid polyethylene glycol and a liquid polypropylene glycol.

4. A process according to claim 3, in which the basic compound used is an ammonium salt, an alkali metal salt or an alkaline-earth metal salt of a carboxylic acid.

5. A process according to claim 3, in which the basic compound used is an ammonium salt, an alkali metal salt of benzoic acid or an alkaline-earth metal salt of salicylic acid.

6. A process according to claim 1, in which the gas mixture brought into contact with the solvent contains hydrogen sulphide and sulphur dioxide in a molar ratio of about 1.9 to about 2.1 moles of hydrogen sulphide per mole of sulphur dioxide.

7. A process according to claim 1, in which the solvent used is selected from the group consisting of ethylene glycol, propylene glycol, a liquid polyethylene glycol and a liquid polypropylene glycol.

8. A process according to claim 7, in which the basic compound used is an ammonium salt, an alkali metal salt or an alkaline-earth metal salt of a carboxylic acid.

9. A process according to claim 7, in which the basic compound used is an ammonium salt, an alkali metal salt of benzoic acid or an alkaline-art meal salt of salicylic acid.

10. A process according to claim 1, in which the basic compound used is an ammonium salt, an alkali metal salt or an alkaline-earth metal salt of a carboxylic acid.

11. A process according to claim 1, in which the basic compound used is an ammonium or alkali metal salt of benzoic acid or an ammonium or alkali metal salt of salicyclic acid.

12. A process according to claim 1, wherein the packing is a random packing.

13. A process according to claim 1, wherein the packing comprises ceramic saddles.

14. A process according to claim 1, further comprising separating the organic solvent at the bottom of the column, passing the separated organic solvent through a heat exchanger to heat the solvent, and recycling the resultant heated organic solvent to the top of the column.

\* \* \* \* \*